United States Patent
Buchanan et al.

[11] Patent Number: 6,105,941
[45] Date of Patent: Aug. 22, 2000

[54] VAPOR/LIQUID CONTACTING CYCLONE WITH DEVICE TO PREVENT BACKMIXING AND PROCESS FOR USING THE SAME

[75] Inventors: John S. Buchanan, Trenton, N.J.; Berne K. Stober, Glen Mills, Pa.

[73] Assignee: Exxon Research and Engineering Company, Florham Park, N.J.

[21] Appl. No.: 09/120,419

[22] Filed: Jul. 22, 1998

[51] Int. Cl.[7] .................................................. B01F 3/04
[52] U.S. Cl. ..................... 261/79.2; 202/158; 261/114.3
[58] Field of Search ............... 261/79.2, 114.3, 261/114.2, 114.5, 114.1; 202/158

[56] References Cited

U.S. PATENT DOCUMENTS

| | | | |
|---|---|---|---|
| 1,878,467 | 9/1932 | Clarke | 261/114.3 X |
| 3,233,389 | 2/1966 | Dahlen | 261/79.2 X |
| 3,345,046 | 10/1967 | Versluys et al. | 261/79.2 |
| 3,498,028 | 3/1970 | Trouw | 261/79.2 X |
| 3,584,844 | 6/1971 | Papp | 261/114.2 |
| 3,605,388 | 9/1971 | Zuiderweg et al. | 261/79.2 X |
| 3,969,096 | 7/1976 | Richard | 55/455 |
| 4,349,360 | 9/1982 | Schuurmans et al. | 261/79.2 X |
| 4,701,307 | 10/1987 | Walters et al. | 422/147 |
| 4,838,906 | 6/1989 | Kiselev | 261/79.2 X |
| 5,266,187 | 11/1993 | Horecky et al. | 208/161 |
| 5,683,629 | 11/1997 | Konijn | 261/79.2 |

FOREIGN PATENT DOCUMENTS

| | | | |
|---|---|---|---|
| 611631 | 6/1978 | U.S.S.R. | 261/79.2 |
| 676295 | 7/1979 | U.S.S.R. | 261/79.2 |

OTHER PUBLICATIONS

Chemical Engineer's Handbook, 5th Edition, R.H. Perry and C. H. Chilton, Ed. McGraw–Hill, 1973, pp. 15–18.

*Primary Examiner*—Richard L. Chiesa
*Attorney, Agent, or Firm*—Paul E. Purwin

[57] ABSTRACT

This invention is directed to a cyclonic vapor/liquid contacting device, wherein liquid exiting the cyclonic device is directed primarily to one side, and distillation or related mass transfer or heat transfer processes employing its use, such as fluid catalytic cracking. Liquid feed is introduced near the floor of the cyclone via downcomer or plenum. Vapor enters through sieve holes in the bottom of the cyclonic device. Near the floor are angled tabs or vanes that impart a spin to the vapor rising up through the floor. The tabs or vanes mix the liquid and vapor. The liquid is then thrown toward the cyclone wall, where it exits through slots in the wall. Preferably, a second set of tabs or vanes, located about in the middle of the cyclone, imparts additional spin to the vapor and entrained liquid rising through the cyclone. This improves liquid collection by the cyclone, especially in cases where a heavy liquid load dampens the spin action of the vapor in the base of the cyclone. Means to direct liquid flow primarily to one side include a shroud around the top of the cyclone, vanes to direct fluid flow downward and baffles between the cyclone barrels.

15 Claims, 5 Drawing Sheets

VAPOR/LIQUID CONTACTING CYCLONE WITH DEVICE TO PREVENT BACKMIXING AND PROCESS FOR USING THE SAME

CROSS-REFERENCE TO RELATED APPLICATIONS

This application is related to co-pending application Ser. No. 09/107,787, filed on Jun. 30, 1998, which is directed to a cyclonic vapor/liquid contacting device containing secondary vanes. This application is herein incorporated by reference.

FIELD OF THE INVENTION

This invention is directed to a cyclonic vapor/liquid contacting device and the process of employing it in distillation or related mass transfer or heat transfer applications, such as fluid catalytic cracking. This invention is directed to the use of flaps or baffles (shrouds) near the outside of openings in the barrel of the cyclone which may be used to help direct liquid out through the openings, thereby preventing backmixing of liquid.

BACKGROUND OF THE INVENTION

Cyclone separators are well-known devices for separating solids from gases and gases from liquids. Some typical cyclone separator designs are illustrated in Perry's Chemical Engineers' Handbook, published by McGraw-Hill Book Company, New York City. In conventional cyclones, spin is imparted to the vapor and entrained liquid after it enters the cyclone via a downcomer or plenum. The vapor and entrained liquid then moves upward, entering a zone where liquid is removed via slots or other perforations in the barrel or by an annular hat in the top of the barrel.

The use of vanes within cyclones is well-known. They are used to guide the flow of gases and minimize entrainment of liquids or solids. U.S. Pat. No. 3,969,096 (Richard) discloses a cyclone separator having multiple vaned gas inlets. The gas inlet consists of elongated inlet openings (like those of a louver) positioned to deflect incoming gas in a circular path from the gas outlet tube.

Some means of preventing backflow from cyclonic devices are known. U.S. Pat. No. 4,701,307 (Walters et al.) discloses a ballistic separation device that results from surrounding the downstream end of a progressive flow reactor or riser reactor with a concentric conduit that is in fluid communication with a cyclone separator. The device may also include a bevelled lip or projection at the axial opening of the progressive flow reactor. In Walters, vapor is being separated from solid, as opposed to vapor being separated from liquid as in the instant invention.

Shrouds on the inlet of a cyclone, rather than on the outlet, are illustrated in U.S. Pat. No. 5,266,187.

SUMMARY OF THE INVENTION

The concept of the instant invention involves a cyclonic vapor/liquid with asymmetric liquid inlet and outlet, as shown in FIGS. 1–3. The liquid is preferably brought in from one side of the barrel, and the liquid effluent from near the top of the barrel is always discharged primarily toward the opposite side, using means such as a shroud around the outside of the top portion of the barrel. Means are also used to prevent liquid backflow, such as baffles between the cyclone barrels which extend preferably 4–10 inches up from the tray deck. The net effect is to force the liquid across the tray deck, from one row of cyclones to the next, without appreciable backmixing. This cross-flow pattern is known to give better contacting efficiency than where liquid backmixing can occur on the tray (see Chemical Engineer's Handbook, 5th Edition, R. H. Perry and C. H. Chilton, Ed. McGraw-Hill, 1973, pp. 15–18).

BRIEF DESCRIPTION OF THE FIGURES

In FIGS. 1–4, the liquid feed to the cyclonic device 15 must be brought in from one side of the base 1 due to the location of the baffles 4. In FIG. 5, the entire perimeter of the cyclone base 1 is accessible for liquid feeding.

DETAILED DESCRIPTION OF THE INVENTION

The key feature of the cyclone of this invention is that liquid exiting the cyclone is directed primarily to one side. The concept of asymmetric discharge may be employed with most cyclone designs, but it is particularly useful in situations in which a secondary spin zone is employed, as disclosed in Ser. No. 09/107,787.

Cyclone having shrouds or other devices to prevent backmixing are best suited for situations in which liquid rate is relatively low and gas rate is relatively high. Liquid flow rates, in cyclones having asymmetric discharge, are preferably limited to less than 40 gallons of liquid per square foot of tower area and more preferably limited to less than 20 gallons of liquid per square foot of tower area.

Figure 1:
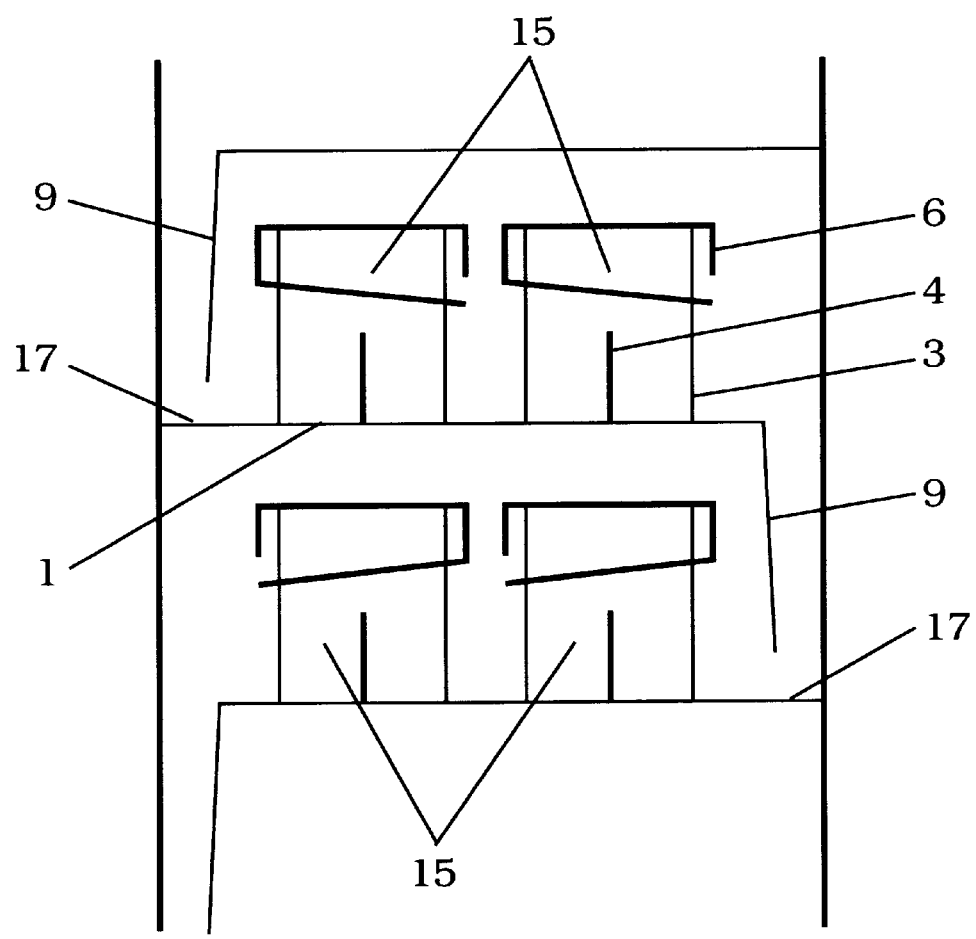
FIG. 1 illustrates an arrangement of cyclonic devices 15, with asymmetric discharge, located on distillation trays 17 in a distillation column 20. Each cyclonic device 15 has a base 1 (i.e., floor), a barrel 3, and shroud 6. The shroud 6 is used to direct fluid exiting the cyclonic device 15 to one side. Fluid released from the cyclonic device 15 is further directed to one side using means such as vanes 9 to direct fluid flow downward and baffles 4, located between the cyclonic devices 15.
Figure 2:
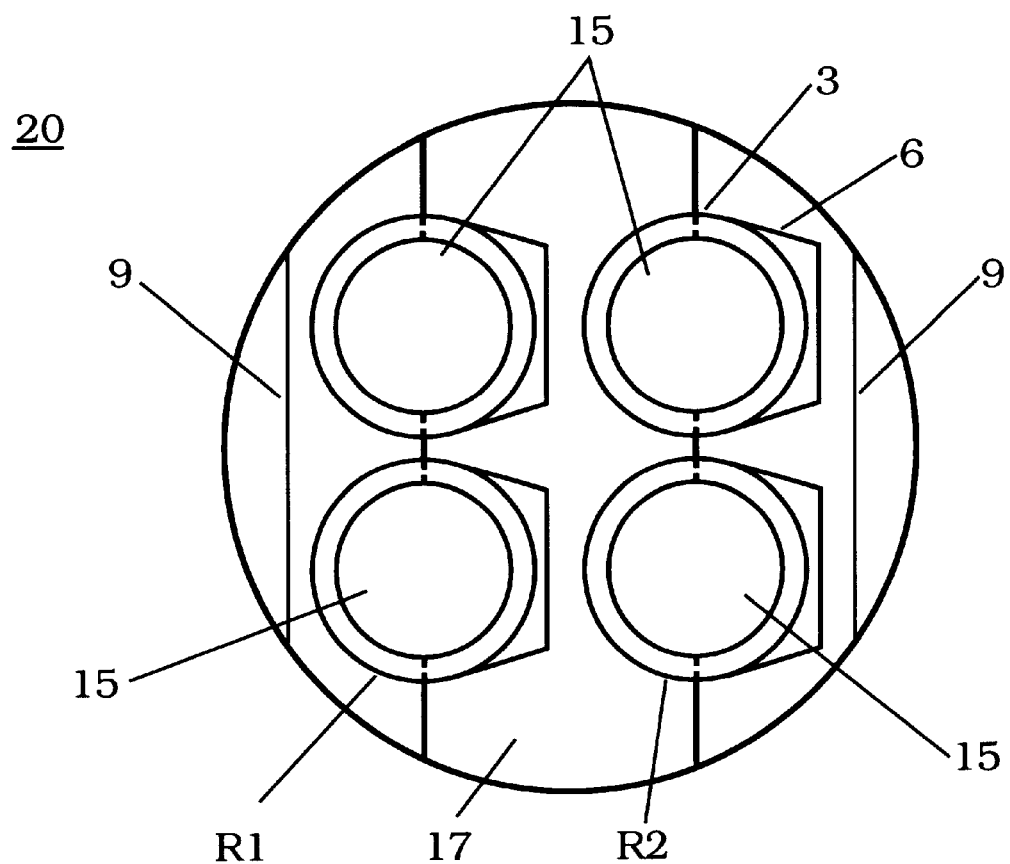
FIG. 2 is a top view of FIG. 1, showing the arrangement of cyclonic devices 15, baffles 4, and vanes 9. Each cyclonic device 15 has a shroud 6 surrounding the barrel 3. Liquid exiting each shroud 6 is forced across tray 17 from one row R1 of cyclonic devices 15 to a next row R2 of cyclonic devices 15, without backmixing using baffles 4.

In some cyclonic devices of the prior art, the liquid may enter the barrel from a central inlet feed tube. In the instant invention, however, liquid is brought down from one tray level to the next via conventional downcomers, rather than via central inlet feed tubes. Thus, the apparatus of FIG. 1 resembles a conventional distillation tray, except that on the tray deck are special cyclonic devices where vapor/liquid contacting and separation take place.

The general arrangement of placing cyclonic contacting devices on trays is well-known. For instance, U.S. Pat. No. 4,838,906 describes a contact and separating elements for a mass-transfer apparatus, with special geometries of ribs and vanes. An annular hat is used to collect the liquid at the top of the cyclone and return it to the tray. The liquid inlets and outlets for this device are pictured as symmetrically distributed around the periphery of the cyclone, so liquid will be drawn in from and discharged to all sides. This can allow some of the liquid that was run through a contacting element to be drawn back into and run through the same element again, which may not be desirable. The major feature that distinguishes this concept from that of U.S. Pat. No. 4,838,906 is that in the instant invention the liquid exiting the cyclone is directed to one side, past the inter-barrel baffle, to force the liquid to move across the tray to the next row of cyclones or to a downcomer to the next tray down. In addition, there are numerous other differences in the specific geometry of the cyclone.

In its most general form, the concept of this invention is not wedded to any particular details of cyclone geometry. Thus, it can encompass a wide variety of means for introducing the liquid feed from outside the cyclone into the base of the cyclone, for imparting spin to the fluids inside the cyclone and for providing liquid removal from the vapor stream. It is not limited to cyclones with secondary spin zones and barrel exit slots. For instance, it could also apply to cyclones with a single set of spin vanes (either intregral with the floor of the cyclone or mounted some distance above the floor) and to cyclones with an annular hat but no lower exit slots for liquid removal. However, the preferred cyclone barrel configuration is (as described above) a non-spinning zone at the base, surmounted by primary spin vanes, exit slots in the barrel and secondary spin vanes. An annular hat atop the cyclone barrel can conveniently be integrated into the surrounding shroud.

Figure 3:
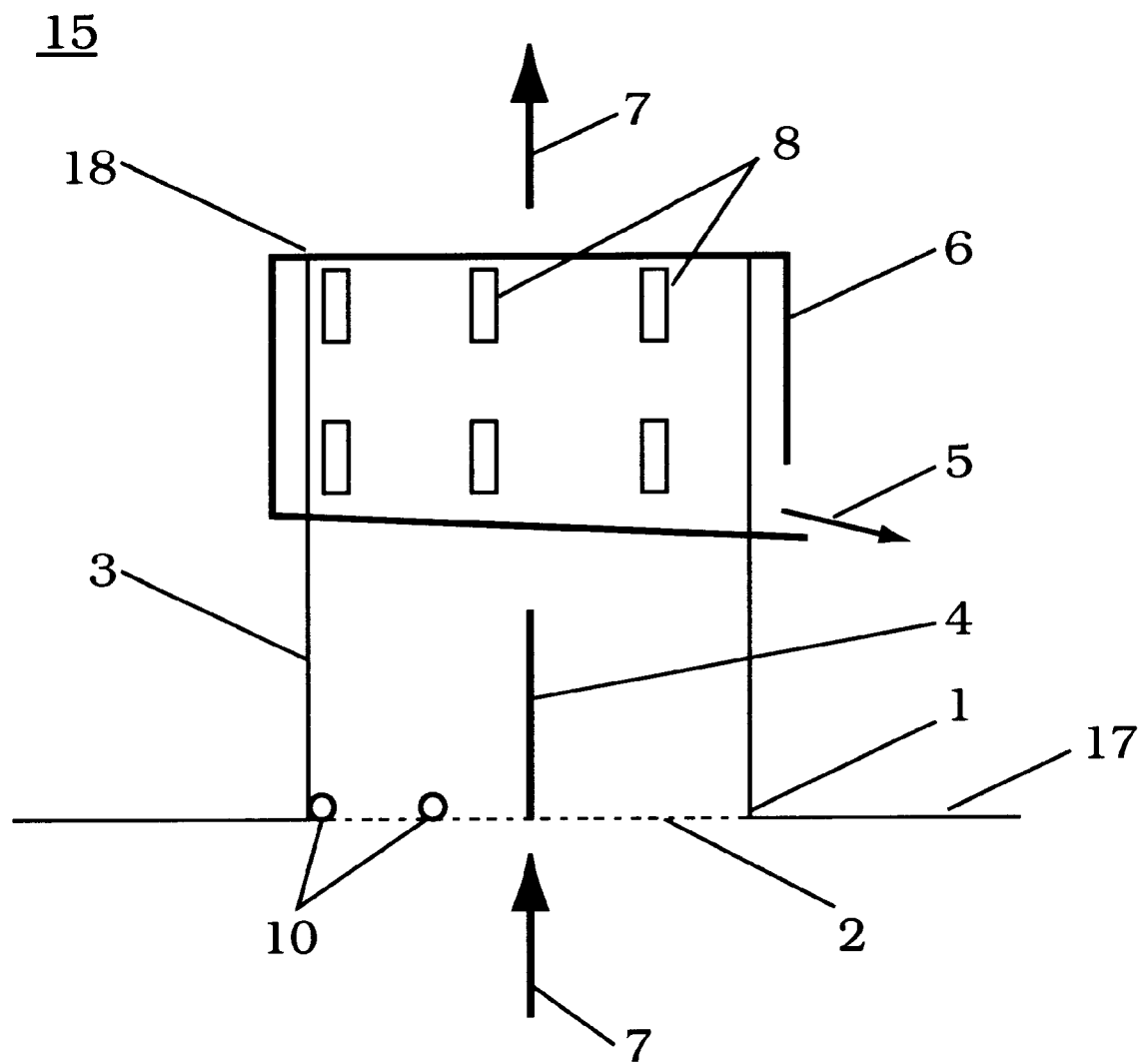
FIG. 3 illustrates a cyclonic device 15 in further detail. There are spin vanes inside the barrel 3 of the cyclonic device 15, but they are not shown, in order to enhance clarity. Liquid enters the cyclonic device 15 at its base 1 via holes 10 in the barrel 3. Vapor 7 enters the cyclonic device 15 via a perforated bottom 2 at the base 1 of the cyclonic device 15. The vapor 7 mixes with the liquid and proceeds up the barrel 3. Liquid 5 exits out of slots 8 in the barrel 3 and is forced out to one side of the cyclonic device 15 due to shroud 6. Vapor 7 is forced out the top 18 of the cyclonic device 15. The baffle 4 forces liquid across the tray 17, from one row of cyclonic devices 15 to the next, without backmixing.
Figure 4:
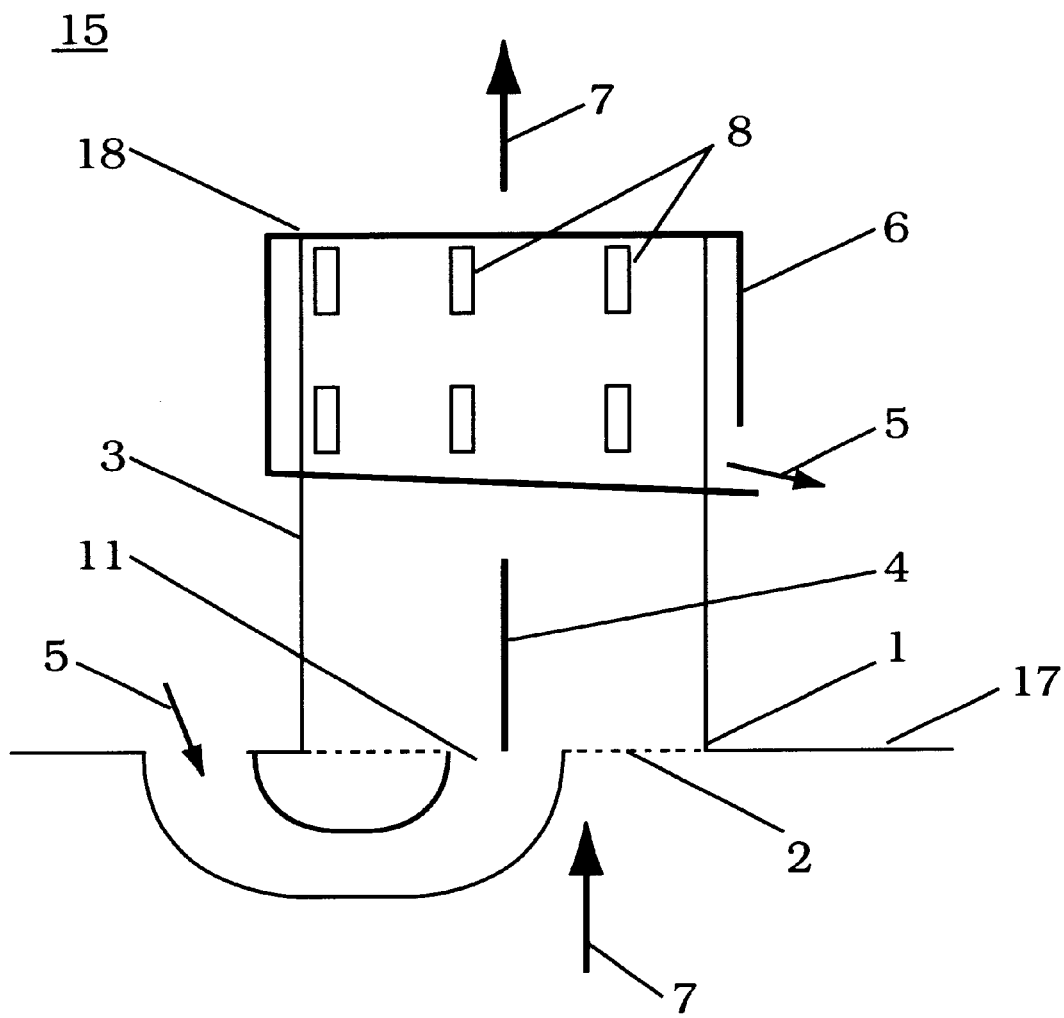
FIG. 4 illustrates the same details of a cyclonic device 15 as in FIG. 3, except that the cyclonic device 15 in FIG. 4 has an alternate liquid inlet. Liquid 5 is conveyed to the center of the cyclonic device 15 via a plenum 16 that is in fluid communication with the tray 17 and base 1 of the cyclonic device 15 at a central feed inlet 11. Liquid 5 once inside the cyclonic device 15 is released into the vapor flow. A circular baffle (not shown) above the central feed inlet 11 to the base 1 would normally be used here to distribute the incoming liquid 5 out to the sides of the barrel 3.
Figure 5:
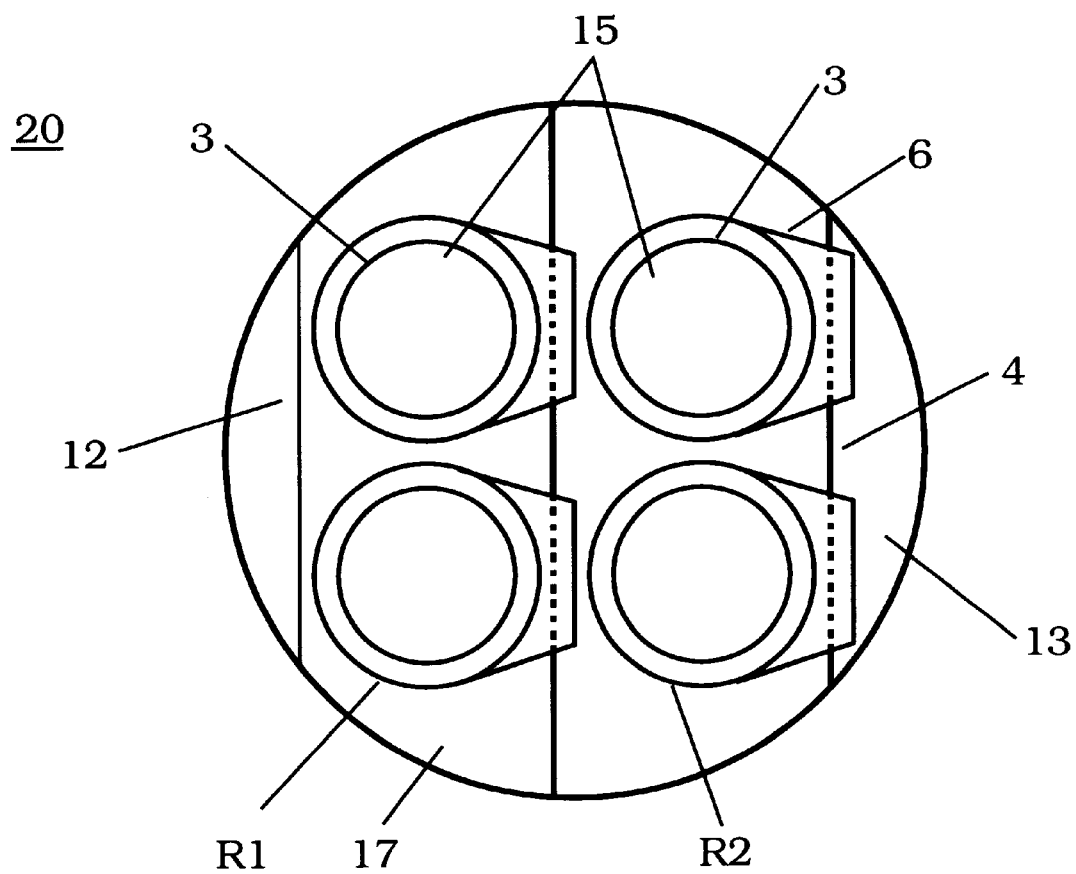
FIG. 5 illustrates a top view of an alternate cyclone arrangement. Shrouds 6 protrude to discharge liquid on the far side of the baffles 4. Visible is an inlet downcomer 12, the baffles 4, and the outlet downcomer 13.

The means of introducing liquid into the base of the cyclone could be as simple as holes in the barrel near the bottom of the barrel, as shown in FIG. 3, or could involve more elaborate systems of plenums, tubes, troughs, vanes and orifices, that may provide more even spatial distribution of liquid and vapor. Several such feed introduction devices are shown in U.S. Pat. No. 3,498,028 and in U.S. Pat. No. 5,683,629. U.S. Pat. No. 3,498,028 is directed primarily to the details of a cyclonic air/liquid cyclone contactor. U.S. Pat. No. 5,683,629 is directed to the overall hardware configuration that appears in a number of patents assigned to Shell, in which the liquid is brought down from a tray level above to a liquid plenum or supply space, from which liquid is fed to the base via cyclonic contactors. In particular, U.S. Pat. No. 5,683,629 describes some liquid feed devices, to be used in connection with their overall configuration. (That configuration differs from that of the instant invention in various significant respects). The feed devices in U.S. Pat. No. 5,683,629 may be useful in our concept.

What is claimed is:

1. A series of cyclonic devices suitable for use in the contacting of vapor and liquid in a distillation or fractionation process, each device comprising:
   (a) a floor;
   (b) a continuous side wall having an upper end and a lower end, said lower end terminating into said floor, said upper end defining an upper cyclonic region, and said side wall defining a contacting volume above said floor and below the upper cyclonic region;
   (c) at least one vapor opening in said floor through which vapors can flow into said contacting volume;
   (d) at least one plenum, located near said floor of the cyclonic device, through which liquid may enter the cyclonic device;
   (e) at least one liquid outlet located on said side wall, said liquid outlet defining an opening in said side wall through which the liquid can flow;
   (f) means for directing the liquid exiting said liquid outlet to one side of the cyclonic device for discharge; and
   (g) at least one set of devices to impart spin to the vapor and the liquid, wherein said series of cyclonic devices are arranged on one or more trays, said arrangement comprising means for directing liquid exiting the discharge side of a first cyclonic device, located on a first tray, into a second cyclonic device located on the first tray.

2. A series of cyclonic devices suitable for use in the contacting of vapor and liquid in a distillation or fractionation process, each device comprising:
   (a) a floor;
   (b) a continuous side wall having an upper end and a lower end, said lower end terminating into said floor, said upper end defining an upper cyclonic region, and said side wall defining a contacting volume above said floor and below the upper cyclonic region;
   (c) at least one vapor opening in said floor through which vapors can flow into said contacting volume;
   (d) at least one tray located outside said side wall, and means through which liquid from the tray enters the cyclonic device at or near its floor;
   (e) at least one liquid outlet located on said side wall, said liquid outlet defining an opening in said side wall through which the liquid can flow;
   (f) means for directing the liquid exiting said liquid outlet to one side of the cyclonic device for discharge onto the tray; and
   (g) at least one set of devices to impart spin to the vapor and the liquid, wherein said series of cyclonic devices are arranged on one or more trays said arrangement comprising means for directing liquid exiting the discharge side of a first cyclonic device, located on a first tray into a second cyclonic device located on the first tray.

3. The series of cyclonic devices recited in claim 1 or 2, wherein said cyclonic device has at least two sets of devices to impart spin to the vapor and the liquid and wherein said at least one liquid outlet is located on said side wall between the first set of spin devices and the second set of spin devices.

4. The series of cyclonic devices recited in claim 1 or 2, wherein said means to direct the liquid flow to one side of the cyclonic device for discharge comprises a shroud around the upper end of the cyclonic device.

5. The series of cyclonic devices recited in claim 4, further comprising an annular hat that is integrated into the shroud around the upper end of the cyclonic device.

6. The series of cyclonic devices recited in claim 1 or 2 wherein the cyclonic devices are located in a tower having liquid flow rates less than 40 gallons of liquid per square foot of tower area.

7. The series of cyclonic devices recited in claim 1 or 2 wherein the cyclonic devices are located in a tower having liquid flow rates less than 20 gallons of liquid per square foot of tower area.

8. The series of cyclonic devices recited in claim 2, wherein the means through which liquid enters the cyclonic device comprises holes in the side wall near the lower end of the side wall.

9. The series of cyclonic devices recited in claim 2, wherein the means through which liquid enters the cyclonic device is selected from the group consisting of plenums, tubes, troughs, vanes and orifices.

10. The series of cyclonic devices of claim 2, wherein the second cyclonic device is located on the discharging side of the first cyclonic device, wherein said arrangement further comprises a downcomer for directing the liquid off the first tray and downward, said downcomer being located on the discharging side of all cyclonic devices on the first tray, and wherein said means for directing the liquid exiting the first cyclonic device into the second cyclonic device further comprises means for directing the liquid across the first tray into one or more cyclonic devices located on the discharging side of the second cyclonic device, or into the downcomer, or both.

11. The series of cyclonic devices of claim 1, wherein the second cyclonic device is located on the discharging side of the first cyclonic device, wherein said arrangement further comprises a downcomer for directing the liquid off the first tray and downward, said downcomer being located on the discharging side of all cyclonic devices on the first tray, and wherein said means for directing the liquid exiting the first cyclonic device into the second cyclonic device further comprises means for directing the liquid across the first tray into one or more cyclonic devices located on the discharging side of the second cyclonic device, or into the downcomer, or both.

12. The series of cyclonic devices of claim 11, wherein said means for directing the liquid exiting the first cyclonic device and said means for directing liquid across the tray comprises baffles, vanes, or a combination thereof.

13. A process for contacting a vapor and a liquid in a column having trays comprising:
   (a) providing a vertical column having surrounding sidewalls and one or more trays within the surrounding sidewalls;
   (b) feeding a first and a second fluid into the column, wherein the first fluid is in its vapor state and the second fluid is in its liquid state within the column;
   (c) directing the first and second fluids through a series of cyclonic devices located on the one or more trays within the column, each device comprising:
      (1) a floor;
      (2) a continuous side wall having an upper end and a lower end, said lower end terminating into said floor, said upper end defining an upper cyclonic region, wherein said upper cyclonic region is enclosed in a shroud for directing liquid exiting the cyclonic device to one side of the cyclonic device for discharge, and wherein said side wall defines a contacting volume above said floor and below the upper cyclonic region;
      (3) at least one vapor opening in said floor through which vapors can flow into said contacting volume;
      (4) at least one liquid inlet for the liquid to enter the cyclonic device, and at least one liquid outlet, wherein said at least one liquid outlet is located on said side wall, said liquid outlet defining an opening in said side wall through which the liquid can flow into said shroud;
      (5) at least two sets of devices to impart spin to the vapor and the liquid, wherein said at least one liquid outlet is located on said side wall between the first set of spin devices and the second set of spin devices;
   (d) directing the liquid exiting the shroud of a first cyclonic device, located on a first tray, to the liquid inlet of a second cyclonic device located on the first tray, and directing the liquid exiting the shroud of one or more cyclonic devices on the first tray through a liquid downcomer, wherein said downcomer comprises:
      (1) a downcomer side wall having an upper portion and a lower portion, said upper portion being located proximate to the first tray of the cyclonic devices, and said lower portion extending below the first tray and having a lower portion end;
      (2) at least one downcomer port located proximate to the lower portion end of the downcomer side wall, said port defining an opening in said downcomer side wall through which liquid can flow from the first tray;

wherein the vapors present within said column flow upward through the cyclonic devices and through said vapor openings, and the liquid and the vapor contact each other in a co-current fashion within the contacting volume of the cyclonic devices.

14. The process of claim 13 further comprising directing the liquid exiting the second cyclonic device into the downcomer, or into at least a third cyclonic device located on the first tray, or a combination thereof, wherein the second cyclonic device is located on the discharging side of the first cyclonic device, the at least third cyclonic device is located on the discharging side of the second cyclonic device, and the downcomer is located on the discharging side of all cyclonic devices on the first tray.

15. The process of claim 14, wherein baffles are used to direct the liquid exiting the cyclonic devices on the first tray, across the first tray, in a direction towards the downcomer, and to prevent liquid discharged from the cyclonic devices on the first tray from reentering the same cyclonic device.

* * * * *

UNITED STATES PATENT AND TRADEMARK OFFICE
CERTIFICATE OF CORRECTION

PATENT NO. : 6,105,941
DATED : August 22, 2000
INVENTOR(S) : Buchanan, et al.

It is certified that error appears in the above-indentified patent and that said Letters Patent is hereby corrected as shown below:

On the title page, item [73] should read as follows:

Assignee: Mobil Oil Corporation
3225 Gallows Road
Fairfax, Virginia 22037

Signed and Sealed this

Tenth Day of April, 2001

Attest:

NICHOLAS P. GODICI

*Attesting Officer*   *Acting Director of the United States Patent and Trademark Office*